US012260978B2

(12) United States Patent
Takahashi

(10) Patent No.: US 12,260,978 B2
(45) Date of Patent: Mar. 25, 2025

(54) INDUCTOR COMPONENT

(71) Applicant: Murata Manufacturing Co., Ltd., Kyoto-fu (JP)

(72) Inventor: Daisuke Takahashi, Nagaokakyo (JP)

(73) Assignee: Murata Manufacturing Co., Ltd., Kyoto-fu (JP)

(*) Notice: Subject to any disclaimer, the term of this patent is extended or adjusted under 35 U.S.C. 154(b) by 631 days.

(21) Appl. No.: 17/675,768

(22) Filed: Feb. 18, 2022

(65) Prior Publication Data

US 2022/0270803 A1 Aug. 25, 2022

(30) Foreign Application Priority Data

Feb. 24, 2021 (JP) ................................ 2021-027471

(51) Int. Cl.
*H01F 17/00* (2006.01)
*H01F 27/29* (2006.01)

(52) U.S. Cl.
CPC ....... *H01F 17/0013* (2013.01); *H01F 27/292* (2013.01)

(58) Field of Classification Search
CPC . H01F 17/0013; H01F 27/292; H01F 27/2823
See application file for complete search history.

(56) References Cited

U.S. PATENT DOCUMENTS

2006/0006972 A1* 1/2006 Tozawa ................. H01F 27/292 336/200
2011/0133875 A1* 6/2011 Chiu ................... H01L 23/5227 336/200
2012/0188047 A1* 7/2012 Groves ............... H01F 17/0013 336/200
2012/0306607 A1* 12/2012 Jeong .................. H01F 17/0013 336/192
2015/0371753 A1* 12/2015 Lee ....................... H01F 27/292 336/200
2020/0335263 A1* 10/2020 Jeon ...................... H01F 41/043

FOREIGN PATENT DOCUMENTS

JP H04-063618 U 5/1992
JP 2001-217126 A 8/2001
JP 2006-032430 A 2/2006

(Continued)

*Primary Examiner* — Malcolm Barnes
(74) *Attorney, Agent, or Firm* — Studebaker Brackett PLLC

(57) ABSTRACT

An inductor component includes an element assembly; a coil inside the element assembly and helically wound along an axis; and first and second outer electrodes in the element assembly and electrically connected to the coil. The element assembly has insulating layers stacked along the axis. The coil has pieces of coil wiring stacked along the axis and via wiring extending along the axis and connecting the pieces of coil wiring adjacent in a direction of the axis. The pieces are each wound along a plane, are electrically connected in series in a helix, and have first and second coil wirings at a respective endmost on one and other sides in a direction parallel to the axis and respectively connected to the first and second outer electrodes. An end surface on the one side has an area smaller than that of an end surface on the other side.

17 Claims, 5 Drawing Sheets

(56) References Cited

FOREIGN PATENT DOCUMENTS

| | | | | |
|---|---|---|---|---|
| JP | 2009-260266 | A | | 11/2009 |
| JP | 2015-015297 | A | | 1/2015 |
| JP | 2015207613 | A | * | 11/2015 |
| JP | 2018-050022 | A | | 3/2018 |
| JP | 2020-136392 | A | | 8/2020 |

* cited by examiner

INDUCTOR COMPONENT

CROSS-REFERENCE TO RELATED APPLICATION

This application claims benefit of priority to Japanese Patent Application No. 2021-027471, filed Feb. 24, 2021, the entire content of which is incorporated herein by reference.

BACKGROUND

Technical Field

The present disclosure relates to an inductor component.

Background Art

Conventional inductor components include one disclosed in Japanese Unexamined Patent Application Publication No. 2015-015297. The inductor component has an element assembly, a coil which is provided inside the element assembly and is helically wound along an axis, and two outer electrodes which are provided on the element assembly and are electrically connected to the coil. The element assembly has a plurality of insulating layers which are stacked along the axis. The coil has a plurality of pieces of coil wiring which are stacked along the axis. The plurality of pieces of coil wiring are each wound along a plane, and are electrically connected in series to constitute a helix.

SUMMARY

Actual manufacture of a conventional inductor component as described earlier has been proved to suffer from the following problem. That is, it has been proved that, if a plurality of insulating layers and a plurality of pieces of coil wiring are stacked, coil wiring at the lowest level is connected to one of outer electrodes, and coil wiring at the highest level is connected to the other outer electrode, coil wiring at a higher position on an upper side in a stacking direction has a smaller thickness. It has been found out that the small thickness of the coil wiring at the highest level may lower reliability of connection between the coil wiring at the highest level and the other outer electrode.

The present inventor has made intensive studies on the above-described phenomenon and has found out the following cause.

If insulating pastes to serve as insulating layers and conductor pastes to serve as pieces of coil wiring are alternately applied and stacked to form a plurality of layers, a portion in an upper surface of a predetermined insulating paste layer which overlaps with a conductor paste located one level lower than the insulating paste layer is convexly formed due to a thickness of the conductor paste. For this reason, in a case where a mask formed by coating a surface of a mesh with an emulsion is used, when a conductor paste is applied with the mask pressed against the upper surface of the insulating paste layer with a squeegee, since the emulsion is not hard, an emulsion in close contact with the convex portion of the upper surface of the insulating paste layer is crushed to decrease in thickness. If the thickness of the emulsion decreases as described above, the amount of conductor paste to be charged into the emulsion decreases, which results in decrease in a thickness of the conductor paste applied onto the upper surface of the insulating paste layer.

At a higher position on an upper side in a stacking direction, a convex portion of an upper surface of an insulating paste layer is thicker, and a conductor paste to be stacked on the convex portion is likely to have a smaller thickness. As described above, in a buildup process, such as printing lamination, a thickness of a convex portion at an upper surface of an insulating paste layer increases cumulatively with increase in the number of layers to be stacked, and a thickness of a conductor paste to be stacked on the convex portion decreases gradually.

Under the circumstances, the present disclosure provides an inductor component capable of enhancing reliability of connection between a coil and outer electrodes.

Therefore, an inductor component according to one aspect of the present disclosure includes an element assembly; a coil which is provided inside the element assembly and is helically wound along an axis; and a first outer electrode and a second outer electrode which are provided in the element assembly and are electrically connected to the coil. The element assembly has a plurality of insulating layers which are stacked along the axis. The coil has a plurality of pieces of coil wiring which are stacked along the axis and via wiring which extends along the axis and connects the pieces of coil wiring adjacent in a direction of the axis. The plurality of pieces of coil wiring are each wound along a plane, and are electrically connected in series to constitute a helix. The plurality of pieces of coil wiring have first coil wiring which is located at an endmost on one side in a direction parallel to the axis and is connected to the first outer electrode and second coil wiring which is located at an endmost on the other side in the direction parallel to the axis and is connected to the second outer electrode. An area of an end surface on the one side in the direction parallel to the axis in the via wiring is smaller than an area of an end surface on the other side in the direction parallel to the axis in the via wiring. A thickness in the direction parallel to the axis of the second coil wiring is larger than a thickness in the direction parallel to the axis of the first coil wiring.

According to the embodiment, since the area of the end surface on the one side in the direction parallel to the axis in the via wiring is smaller than the area of the end surface on the other side in the direction parallel to the axis in the via wiring. In terms of a construction method, the one side in the direction parallel to the axis corresponds to a lower side in a stacking direction while the other side in the direction parallel to the axis corresponds to an upper side in the stacking direction. For this reason, the second coil wiring is located on the upper side in the stacking direction.

Since the thickness in the direction parallel to the axis of the second coil wiring is larger than the thickness in the direction parallel to the axis of the first coil wiring, the thickness of the second coil wiring on the upper side in the stacking direction can be made larger. This allows increase in a connection area of the second coil wiring to be connected to the second outer electrode on the upper side in the stacking direction and enhancement of reliability of connection between the second outer electrode and the second coil wiring. It is thus possible to enhance reliability of connection between the coil and the outer electrodes.

One embodiment of the inductor component includes an element assembly; a coil which is provided inside the element assembly and is helically wound along an axis; and a first outer electrode and a second outer electrode which are provided in the element assembly and are electrically connected to the coil. The element assembly has a plurality of insulating layers which are stacked along the axis. The coil has a plurality of pieces of coil wiring which are stacked along the axis. The plurality of pieces of coil wiring are each wound along a plane, and are electrically connected in series to constitute a helix. The coil wiring is composed of one coil conductor layer or a plurality of coil conductor layers which are stacked along the axis and are electrically connected in parallel. The plurality of pieces of coil wiring have first coil wiring which is located at an endmost on one side in a direction parallel to the axis and is connected to the first outer electrode and second coil wiring which is located at an endmost on the other side in the direction parallel to the axis and is connected to the second outer electrode. The number of layers of the coil conductor layer or the coil conductor layers constituting the second coil wiring is larger than the number of layers of the coil conductor layer or the coil conductor layers constituting the first coil wiring.

According to the embodiment, since the number of layers of the coil conductor layer or the coil conductor layers constituting the second coil wiring is larger than the number of layers of the coil conductor layer or the coil conductor layers constituting the first coil wiring, if the second coil wiring is set on the upper side in the stacking direction, the number of layers of the coil conductor layer or the coil conductor layers of the second coil wiring on an higher-level side can be made larger. This allows increase in the number of connections of coil conductor layers to be connected to the second outer electrode on the upper side in the stacking direction and enhancement of reliability of connection between the second outer electrode and the second coil wiring. It is thus possible to enhance reliability of connection between the coil and the outer electrodes.

Preferably, in one embodiment of the inductor component, the coil has via wiring which extends along the axis and connects the pieces of coil wiring adjacent in a direction of the axis, and an area of an end surface on the one side in the direction parallel to the axis in the via wiring is smaller than an area of an end surface on the other side in the direction parallel to the axis in the via wiring.

According to the embodiment, the area of the end surface on the one side in the direction parallel to the axis in the via wiring is smaller than the area of the end surface on the other side in the direction parallel to the axis in the via wiring. In terms of a construction method, the one side in the direction parallel to the axis corresponds to a lower side in a stacking direction while the other side in the direction parallel to the axis corresponds to an upper side in the stacking direction. For this reason, the second coil wiring is located on the upper side in the stacking direction, and the number of layers of the coil conductor layer or the coil conductor layers of the second coil wiring on the higher-level side can be made larger. It is thus possible to enhance the reliability of connection between the second outer electrode and the second coil wiring on the upper side in the stacking direction.

Preferably, in one embodiment of the inductor component, the element assembly includes a first end surface and a second end surface which face each other, a first side surface and a second side surface which face each other, a bottom surface which is connected between the first end surface and the second end surface and between the first side surface and the second side surface, and a top surface which faces the bottom surface. The first outer electrode is formed to extend from the first end surface to the bottom surface. The second outer electrode is formed to extend from the second end surface to the bottom surface. The coil is wound along the axis such that the axis is parallel to the bottom surface and such that the axis intersects the first side surface and the second side surface. The coil has a wound portion which is helically wound, a first extended portion which is connected between a first end of the wound portion and the first outer electrode, and a second extended portion which is connected between a second end of the wound portion and the second outer electrode. At least one extended portion of the first extended portion and the second extended portion has a horizontal line portion which extends in a direction parallel to the bottom surface so as to separate from the wound portion on a side with the top surface of the wound portion and a vertical line portion which is connected to the horizontal line portion and extends in a direction orthogonal to the bottom surface toward a side with the bottom surface, as viewed from the direction parallel to the axis.

The wound portion here refers to a helically wound portion where parts of the coil overlap with each other when viewed in the direction parallel to the axis.

According to the embodiment, since the at least one extended portion has the horizontal line portion and the vertical line portion, the vertical line portion is separated from the wound portion by the horizontal line portion. As described above, the vertical line portion and the wound portion can be separated as viewed from the direction parallel to the axis, and shorting between the at least one extended portion and the wound portion can be prevented.

Preferably, in one embodiment of the inductor component, a shortest distance between the vertical line portion and the wound portion is more than or equal to one-half of a line width of the pieces of coil wiring constituting the wound portion, as viewed from the direction parallel to the axis.

The line width of the pieces of coil wiring here refers to a width in a direction orthogonal to a direction, in which the pieces of coil wiring extend, as viewed from the direction parallel to the axis.

According to the embodiment, the vertical line portion and the wound portion can be more widely separated as viewed from the direction parallel to the axis, and shorting between the at least one extended portion and the wound portion can be more effectively prevented.

Preferably, in one embodiment of the inductor component, a line width of the second coil wiring is larger than a line width of the first coil wiring.

According to the embodiment, a connection area of the second coil wiring to be connected to the second outer electrode can be made larger, and the reliability of connection between the second outer electrode and the second coil wiring can be further enhanced.

Preferably, in one embodiment of the inductor component, the second coil wiring has a first portion which is connected to the second outer electrode and a second portion other than the first portion, and a line width of the first portion is larger than a line width of the second portion.

According to the embodiment, a connection area of the second coil wiring to be connected to the second outer electrode can be made larger, and the reliability of connection between the second outer electrode and the second coil wiring can be further enhanced.

According to the inductor component as the one aspect of the present disclosure, the reliability of connection between the coil and the outer electrodes can be enhanced.

DETAILED DESCRIPTION

An inductor component according to one aspect of the present disclosure will be described in detail below with illustrated embodiments. Note that drawings may include as part schematic one and may fail to reflect actual dimensions and proportions.

First Embodiment

Figure 1:
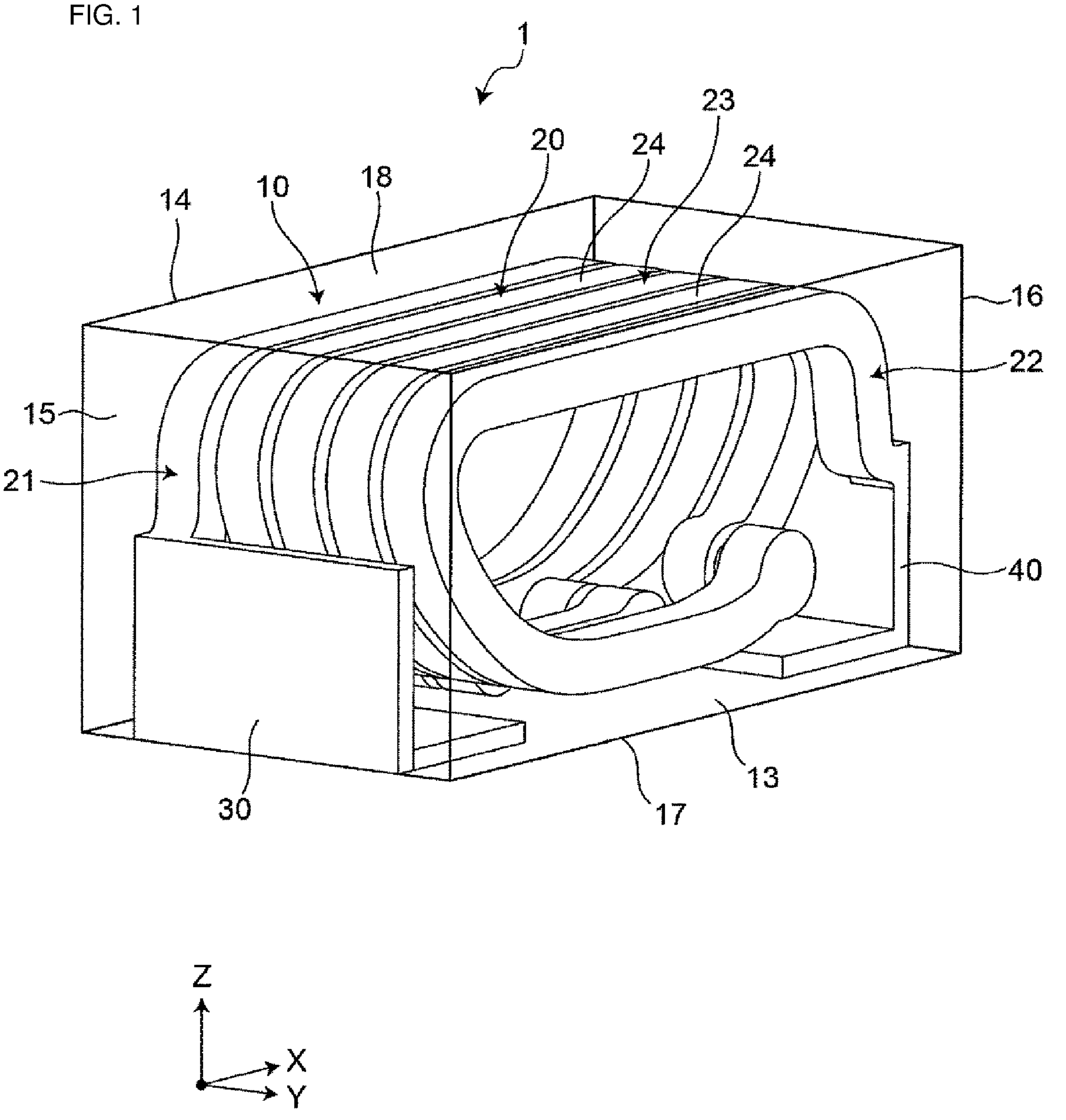
FIG. 1 is a see-through perspective view showing a first embodiment of an inductor component.
Figure 2:
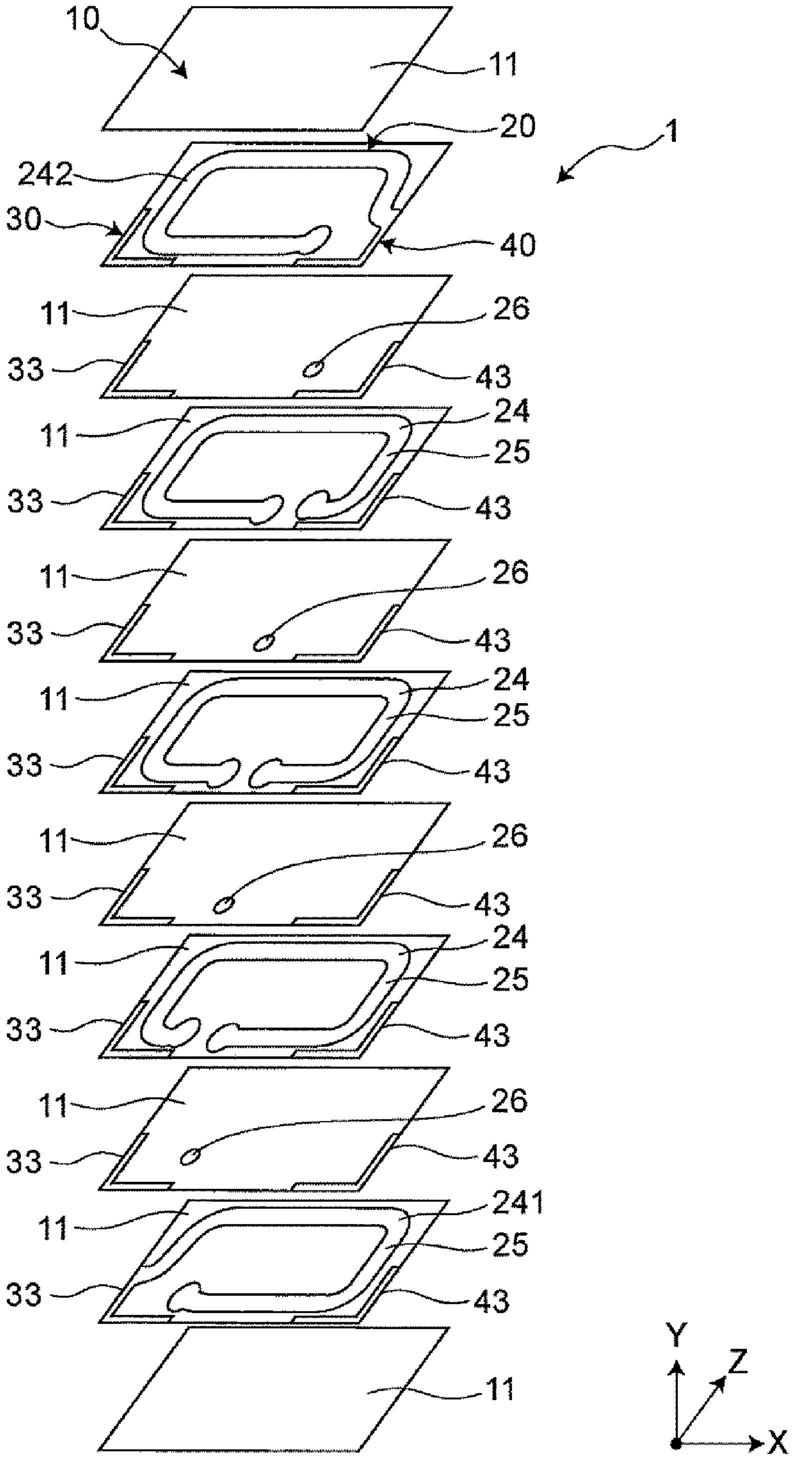
FIG. 2 is an exploded perspective view of the inductor component.

FIG. 1 is a see-through perspective view showing a first embodiment of an inductor component. FIG. 2 is an exploded perspective view of the inductor component. As shown in FIGS. 1 and 2, an inductor component 1 has an element assembly 10, a coil 20 which is provided inside the element assembly 10 and is helically wound along an axis, and a first outer electrode 30 and a second outer electrode 40 which are provided in the element assembly 10 and are electrically connected to the coil 20. Although the element assembly 10 is drawn in FIG. 1 as transparent for easy understanding of a structure thereof, the element assembly 10 may be semitransparent or opaque.

The inductor component 1 is electrically connected to wiring of a circuit board (not shown) via the first and second outer electrodes 30 and 40. The inductor component 1 is used as, for example, a coil (matching coil) for impedance matching of a high-frequency circuit and is used in electronic equipment, such as a personal computer, a DVD player, a digital camera, a TV, a cellular phone, car electronics, and medical and industrial machines. Note that purposes of the inductor component 1 are not limited to this purpose and that the inductor component 1 can also be used in, for example, a tuning circuit, a filter circuit, or a rectifying and smoothing circuit.

The element assembly 10 is formed in a substantially rectangular parallelepiped shape. Surfaces of the element assembly 10 include a first end surface 15 and a second end surface 16 which face each other, a first side surface 13 and a second side surface 14 which face each other, a bottom surface 17 which is connected between the first end surface 15 and the second end surface 16 and between the first side surface 13 and the second side surface 14, and a top surface 18 which faces the bottom surface 17. Note that, as shown in FIG. 1, an X direction is a direction orthogonal to the first end surface 15 and the second end surface 16, a Y direction is a direction orthogonal to the first side surface 13 and the second side surface 14, and a Z direction is a direction orthogonal to the bottom surface 17 and the top surface 18 and is a direction orthogonal to the X direction and the Y direction.

The element assembly 10 is composed of a plurality of insulating layers 11 stacked. The insulating layer 11 is made of, for example, a material having borosilicate glass as a main component or a material, such as ferrite or resin. A stacking direction of the insulating layers 11 is a direction (the Y direction) parallel to the first and second end surfaces 15 and 16 and the bottom surface 17 of the element assembly 10. That is, the insulating layer 11 has the shape of a layer spreading along an XZ plane. The term "parallel" in the present application is not limited to a strict parallel relationship and includes a substantial parallel relationship with an actual variation range in mind. Note that the element assembly 10 may be such that interfaces between the plurality of insulating layers 11 may be ill-defined due to, for example, burning.

The first outer electrode 30 and the second outer electrode 40 are made of, for example, a conductive material, such as Ag, Cu, Au, or an alloy having the metals as main components. The first outer electrode 30 has an L-shape which is formed to extend from the first end surface 15 to the bottom surface 17. The first outer electrode 30 is embedded in the element assembly 10 so as to be exposed from the first end surface 15 and the bottom surface 17. The second outer electrode 40 has an L-shape which is formed to extend from the second end surface 16 to the bottom surface 17. The second outer electrode 40 is embedded in the element assembly 10 so as to be exposed from the second end surface 16 and the bottom surface 17.

The first outer electrode 30 and the second outer electrode 40 have a configuration in which a plurality of first outer electrode conductor layers 33 and a plurality of second outer electrode conductor layers 43 embedded in the element assembly 10 (the insulating layers 11) are stacked. The outer electrode conductor layers 33 extend along the first end surface 15 and the bottom surface 17, and the outer electrode conductor layers 43 extend along the second end surface 16 and the bottom surface 17. Since the outer electrodes 30 and 40 can be embedded in the element assembly 10, reduction in inductor component size can be achieved as compared with a configuration in which outer electrodes can be externally added to the element assembly 10. The coil 20 and the outer electrodes 30 and 40 can be formed in a single process, and variation in a positional relationship between the coil 20 and the outer electrodes 30 and 40 is reduced. This allows reduction in variation in electrical characteristics of the inductor component 1.

The coil 20 is made of, for example, the same conductive material as the first and second outer electrodes 30 and 40. The coil 20 is helically wound along the stacking direction of the insulating layers 11. A first end of the coil 20 is connected to the first outer electrode 30, and a second end of the coil 20 is connected to the second outer electrode 40. Note that although the coil 20 is integral with the first and second outer electrodes 30 and 40 in the present embodiment and there is no defined border, the present disclosure is not limited to this. A coil and outer electrodes may be formed of different kinds of materials or by different kinds of construction methods, and there may be a border.

The coil 20 is wound along the axis such that the axis is parallel to the bottom surface 17 and such that the axis intersects the first side surface 13 and the second side surface 14. The axis of the coil 20 coincides with the stacking direction (Y direction) of the insulating layers 11. The axis of the coil 20 means a central axis of a helical shape of the coil 20.

The coil 20 has a wound portion 23, a first extended portion 21 which is connected between a first end of the wound portion 23 and the first outer electrode 30, and a second extended portion 22 which is connected between a second end of the wound portion 23 and the second outer electrode 40. Although the wound portion 23 is integral with the first and second extended portions 21 and 22 in the present embodiment and there is no defined border, the present disclosure is not limited to this. A wound portion and extended portions may be formed of different kinds of materials or by different kinds of construction methods, and there may be a border.

The wound portion 23 may be helically wound along the axis. That is, the wound portion 23 refers to a helically wound portion where parts of the coil 20 overlap with each other when viewed from a direction parallel to the axis. The first and second extended portions 21 and 22 refer to portions which are out of the overlapping portions. Although the wound portion 23 is formed in a substantially rectangular shape as viewed from an axial direction, the wound portion 23 is not limited to this shape. The shape of the wound portion 23 may be, for example, a circular shape, an elliptical shape, or any other polygonal shape.

The coil 20 has a plurality of pieces of coil wiring 24 which are stacked along the axis and via wiring 26 which extends along the axis and connects the pieces of coil wiring 24 adjacent in the axial direction. The plurality of pieces of coil wiring 24 are each wound along a plane, and are electrically connected in series to constitute a helix.

The coil wiring 24 is formed by being wound on a principal surface (the XZ plane) of the insulating layer 11 which is orthogonal to the axial direction. Although the number of turns of the coil wiring 24 is less than 1, the number of turns may be more than or equal to 1. The via wiring 26 extends through the insulating layer 11 in a thickness direction (the Y direction). The pieces of coil wiring 24 that are adjacent in the stacking direction are electrically connected in series via the via wiring 26. As described above, the plurality of pieces of coil wiring 24 are electrically connected in series to one another to constitute a helix. The coil wiring 24 is composed of one coil conductor layer 25.

Figure 3:
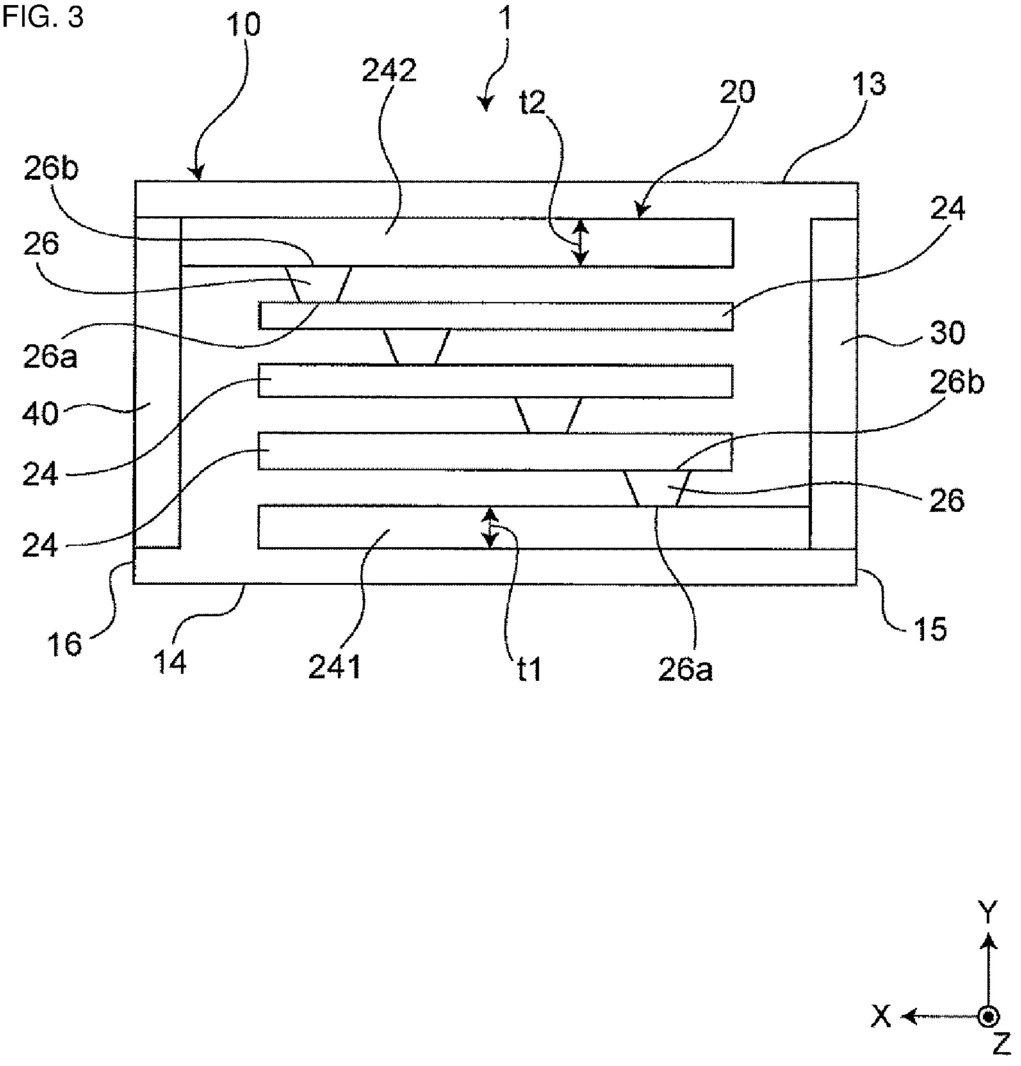
FIG. 3 is a see-through plan view of the inductor component as viewed from above.

FIG. 3 is a see-through plan view of the inductor component as viewed from above. Although the element assembly 10 is drawn in FIG. 3 as transparent for easy understanding of the structure, the element assembly 10 may be semitransparent or opaque.

As shown in FIGS. 2 and 3, the plurality of pieces of coil wiring 24 include first coil wiring 241 which is located at an endmost on one side in the direction parallel to the axis and is connected to the first outer electrode 30 and second coil wiring 242 which is located at an endmost on the other side in the direction parallel to the axis and is connected to the second outer electrode 40. The one side in the direction parallel to the axis refers to a backward direction of the Y direction (the second side surface 14 side) while the other side in the direction parallel to the axis refers to a forward direction of the Y direction (the first side surface 13 side).

An area of a first end surface 26*a* on the one side in the direction parallel to the axis in the via wiring 26 is smaller than an area of a second end surface 26*b* on the other side in the direction parallel to the axis in the via wiring 26. For this reason, in terms of a construction method, the one side in the direction parallel to the axis corresponds to a lower side in the stacking direction while the other side in the direction parallel to the axis corresponds to an upper side in the stacking direction.

Specifically, in a manufacturing method for the inductor component 1, the inductor component 1 is manufactured by alternately stacking the pieces of coil wiring 24 and the insulating layers 11 from the insulating layer 11 on the lower side shown in FIG. 2 toward the insulating layer 11 on the upper side. In a manufacturing method for the via wiring 26, a cavity is formed in the insulating layer 11 by, for example, a photolithography method or a laser method, and the via wiring 26 is provided in the cavity of the insulating layer 11 by, for example, screen printing. At this time, the opening of the insulating layer 11 is formed in terms of the construction method such that an inner diameter on the lower side in the stacking direction is smaller than an inner diameter on the upper side in the stacking direction. For this reason, the area of the first end surface 26*a* on the lower side in the stacking direction of the via wiring 26 is smaller than the area of the second end surface 26*b* on the upper side in the stacking direction of the via wiring 26.

With the above-described shape of the via wiring 26, the second coil wiring 242 is located on the upper side in the stacking direction, and the first coil wiring 241 is located on the lower side in the stacking direction. A thickness t2 in the direction parallel to the axis of the second coil wiring 242 is larger than a thickness t1 in the direction parallel to the axis of the first coil wiring 241. The thicknesses t1 and t2 here refer to average thicknesses of the pieces of coil wiring.

Note that, in measurement of an average thickness of coil wiring, a section in a middle including the direction (the Y direction) parallel to the axis of a linear portion which is longest in the coil wiring to be measured is first exposed along the linear portion by, for example, grinding. The section may be then photographed by a scanning electron microscope, a thickness in the direction parallel to the axis of the linear portion may be measured at five points to obtain an average value, and the average value may be regarded as an average thickness of the coil wiring.

According to the above-described configuration, since the thickness t2 of the second coil wiring 242 is larger than the thickness t1 of the first coil wiring 241, the thickness t2 of the second coil wiring 242 on the upper side in the stacking direction can be made larger. This allows increase in a connection area of the second coil wiring 242 to be connected to the second outer electrode 40 on the upper side in the stacking direction and enhancement of reliability of connection between the second outer electrode 40 and the second coil wiring 242. It is thus possible to enhance reliability of connection between the coil 20 and the outer electrodes 30 and 40.

Specifically, as described in the Summary above, in a buildup process, such as printing lamination, at a higher position on an upper side in a stacking direction, a convex portion of an upper surface of an insulating paste layer (insulating layer) is thicker, and a conductor paste (coil wiring) to be stacked on the convex portion is likely to have a smaller thickness. For this reason, control is performed such that a thickness of a conductor paste at the highest level corresponding to the second coil wiring 242 is larger than a thickness of a conductor paste at the lowest level corresponding to the first coil wiring 241, thereby making the thickness t2 of the second coil wiring 242 larger than the thickness t1 of the first coil wiring 241. It is thus possible to make the connection area of the second coil wiring 242 to be connected to the second outer electrode 40 larger.

Note that, since a design value for the thickness t1 of the first coil wiring 241 can be ensured in terms of the construction method, reliability of connection between the first outer electrode 30 and the first coil wiring 241 can be ensured. Although a thickness of the coil wiring 24 present between the first coil wiring 241 and the second coil wiring 242 is smaller than the thickness t1 of the first coil wiring 241 in terms of the construction method, the thickness may be controlled so as to be larger than the thickness t1 of the first coil wiring 241.

Referring to FIG. 2, a line width of the second coil wiring 242 is preferably larger than a line width of the first coil wiring 241. The line widths of the coil wiring 241 and the coil wiring 242 refer to respective average dimensions of dimensions in a direction orthogonal to a direction in which the coil wiring 241 and the coil wiring 242 extend as viewed from the axial direction.

Note that, in measurement of a line width of coil wiring, a section in a middle of the coil wiring to be measured is first exposed by, for example, grinding from the axial direction. The section may be then photographed by the scanning electron microscope, a line width of the coil wiring may be measured at five points to obtain an average value, and the average value may be regarded as the line width of the coil wiring.

With the above-described configuration, the connection area of the second coil wiring 242 to be connected to the second outer electrode 40 can be made larger, and the reliability of connection between the second outer electrode 40 and the second coil wiring 242 can be further enhanced.

Figure 4:
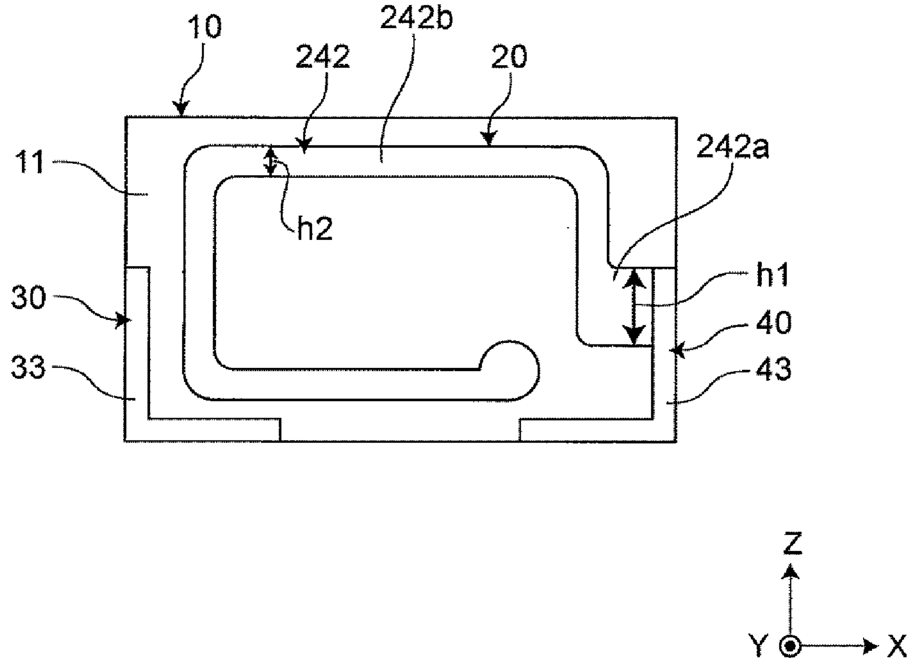
FIG. 4 is a schematic view showing another shape for second coil wiring.

Preferably, as shown in FIG. 4, the second coil wiring 242 has a first portion 242*a* to be connected to the second outer electrode 40 and a second portion 242*b* other than the first portion 242*a*. A line width h1 of the first portion 242*a* is larger than a line width h2 of the second portion 242*b*. The line width h1 of the first portion 242*a* refers to a line width at a contact surface with the second outer electrode 40 in the first portion 242*a*. The line width h2 of the second portion 242*b* refers to an average dimension in a direction in which the second portion 242*b* extends. The first portion 242*a* preferably corresponds to the second extended portion 22.

With the above-described configuration, the connection area of the second coil wiring 242 to be connected to the second outer electrode 40 can be made larger, and the reliability of connection between the second outer electrode 40 and the second coil wiring 242 can be further enhanced.

Second Embodiment

Figure 5:
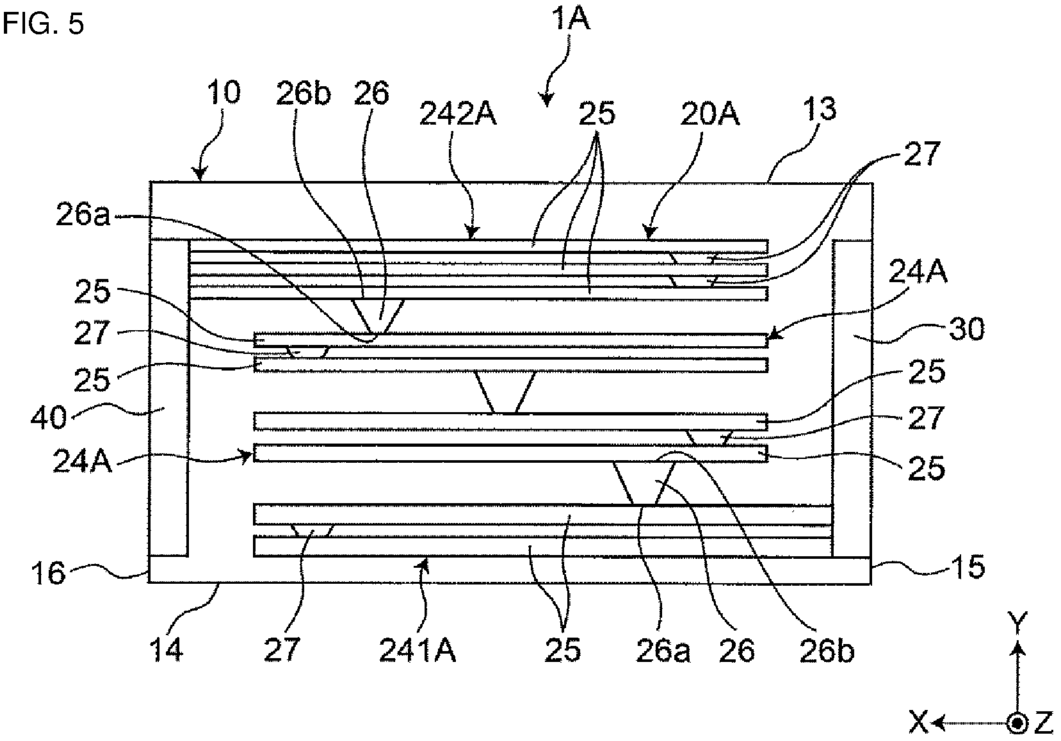
FIG. 5 is a see-through plan view as viewed from above showing a second embodiment of the inductor component.

FIG. 5 is a see-through plan view as viewed from above showing a second embodiment of the inductor component. The second embodiment is different in the number of layers of coil conductor layers of coil wiring from the first embodiment. Different components will be described below. The other components are the same as the first embodiment, the components are denoted by identical reference characters in the first embodiment, and a description thereof will be omitted. Note that the number of layers of pieces of coil wiring 24A is drawn in FIG. 5 as smaller than the number of layers of pieces of coil wiring in FIG. 3, for convenience's sake.

As shown in FIG. 5, in a coil 20A of an inductor component 1A according to the second embodiment, each coil wiring 24A is composed of a plurality of coil conductor layers 25. In each coil wiring 24A, the plurality of coil conductor layers 25 are stacked along an axis and are electrically connected in parallel. Although the plurality of coil conductor layers 25 are connected in parallel via a via conductor 27, the plurality of coil conductor layers 25 may be connected in parallel while in surface contact with each other.

The number of layers of the coil conductor layers 25 constituting second coil wiring 242A to be connected to a second outer electrode 40 is larger than the number of layers of the coil conductor layers 25 constituting first coil wiring 241A to be connected to a first outer electrode 30. Specifically, the number of layers of the coil conductor layers 25 of the second coil wiring 242A is three, and the number of layers of the coil conductor layers 25 of the first coil wiring 241A is two. Note that the number of layers of the coil conductor layers 25 of the coil wiring 24A other than the first coil wiring 241A and the second coil wiring 242A is two.

An area of a first end surface 26*a* of via wiring 26 is smaller than an area of a second end surface 26*b* of the via wiring 26. For this reason, the second coil wiring 242A is located on an upper side in a stacking direction while the first coil wiring 241A is located on a lower side in the stacking direction. A lower end surface and an upper end surface of the via conductor 27 are like the first end surface 26*a* and the second end surface 26*b* of the via wiring 26, and an area of the lower end surface is smaller than an area of the upper end surface. Note that the area of the lower end surface may be the same as or larger than the area of the upper end surface in the via conductor 27.

According to the above-described configuration, since the number of layers of the coil conductor layers 25 constituting the second coil wiring 242A is larger than the number of layers of the coil conductor layers 25 constituting the first coil wiring 241A, the number of layers of the coil conductor layers 25 of the second coil wiring 242A on a higher-level side can be made larger. This allows increase in the number of connections of the coil conductor layers 25 to be connected to the second outer electrode 40 on the upper side in the stacking direction and enhancement of reliability of connection between the second outer electrode 40 and the second coil wiring 242A. It is thus possible to enhance reliability of connection between the coil 20A and the outer electrodes 30 and 40.

Specifically, as described above, in a buildup process, such as printing lamination, at a higher position on an upper side in a stacking direction, a convex portion of an upper surface of an insulating paste layer (insulating layer) is thicker, and a conductor paste (coil wiring) to be stacked on the convex portion is likely to have a smaller thickness. For this reason, control is performed such that the number of layers of a conductor paste at the highest level corresponding to the second coil wiring 242A is larger than the number of layers of a conductor paste at the lowest level corresponding to the first coil wiring 241A, thereby making the number of layers of the coil conductor layers 25 of the second coil wiring 242A larger than the number of layers of the coil conductor layers 25 of the first coil wiring 241A. It is thus possible to make the number of connections of the second coil wiring 242A to be connected to the second outer electrode 40 larger. Note that, since a design value for a thickness of the first coil wiring 241A can be ensured in terms of a construction method, reliability of connection between the first outer electrode 30 and the first coil wiring 241A can be ensured even if the number of layers of the coil conductor layers 25 of the first coil wiring 241A is made smaller.

In contrast, in a case where the number of layers of coil conductor layers constituting coil wiring is the same for every coil wiring, if a coil conductor layer at a higher position on an upper side in a stacking direction has a smaller thickness, reliability of connection between an outer electrode and coil wiring may be lower at the upper side.

Note that although each coil wiring 24A is composed of a plurality of coil conductor layers 25 in this embodiment, at least one coil wiring 24A of all the pieces of coil wiring 24A except the second coil wiring 242A may be composed of one coil conductor layer 25.

In this embodiment, a thickness in a direction parallel to the axis and a line width of the second coil wiring 242A may be the same as or smaller than a thickness in the direction parallel to the axis and a line width of the first coil wiring 241A, unlike the first embodiment.

Third Embodiment

Figure 6:
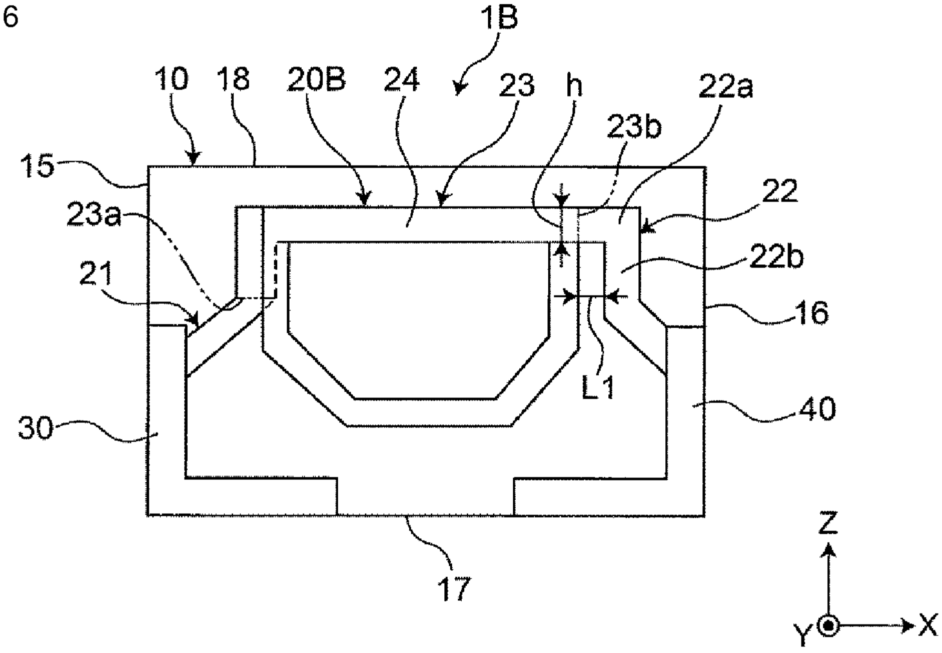
FIG. 6 is a see-through front view as viewed from a first side surface showing a third embodiment of the inductor component.

FIG. 6 is a see-through front view as viewed from a first side surface showing a third embodiment of the inductor component. The third embodiment is different in a configuration of an extended portion of a coil from the first embodiment. Different components will be described below. The other components are the same as the first embodiment, the components are denoted by identical reference characters in the first embodiment, and a description thereof will be omitted.

As shown in FIG. 6, in a coil 20B of an inductor component 1B according to the third embodiment, a first extended portion 21 is connected between a first end 23*a* of a wound portion 23 and a first outer electrode 30, and a second extended portion 22 is connected between a second end 23*b* of the wound portion 23 and a second outer electrode 40. Since the wound portion 23 is a portion, parts of which overlap with each other when viewed in a direction parallel to an axis and which is helically wound, the first end 23*a* and the second end 23*b* are end surfaces which are out of the helically wound portion.

The first extended portion 21 extends such that the first end 23*a* and the first outer electrode 30 are connected with a shortest distance. That is, the first extended portion 21 is inclined with respect to an X direction and a Z direction as viewed from the direction parallel to the axis.

The second extended portion 22 has a horizontal line portion 22*a* which extends from the second end 23*b* in the X direction and a vertical line portion 22*b* which extends from the horizontal line portion 22*a* in the Z direction, as viewed from the direction parallel to the axis. Additionally, the second extended portion 22 extends inclined with respect to the X direction and the Z direction between the vertical line portion 22*b* and the second outer electrode 40 such that the vertical line portion 22*b* and the second outer electrode 40 are connected with a shortest distance.

The horizontal line portion 22*a* extends in a direction parallel to a bottom surface 17 so as to separate from the wound portion 23 on a top surface 18 side of the wound portion 23. Here, being parallel to the bottom surface 17 is assumed to include not only being perfectly parallel to the bottom surface 17 but also being substantially parallel to the bottom surface 17, such as being slightly curved with respect to the bottom surface 17.

The vertical line portion 22*b* is connected to the horizontal line portion 22*a* and extends in a direction orthogonal to the bottom surface 17 toward the bottom surface 17 side. Here, being orthogonal to the bottom surface 17 is assumed to include not only being perfectly orthogonal to the bottom surface 17 but also being substantially orthogonal to the bottom surface 17, such as being slightly inclined with respect to a direction perfectly orthogonal to the bottom surface 17.

According to the above-described configuration, since the second extended portion 22 has the horizontal line portion 22*a* and the vertical line portion 22*b*, the vertical line portion 22*b* is separated from the wound portion 23 by the horizontal line portion 22*a*. As described above, the vertical line portion 22*b* and the wound portion 23 can be separated as viewed from the direction parallel to the axis, and shorting between the second extended portion 22 and the wound portion 23 can be prevented.

Preferably, a shortest distance L1 between the vertical line portion 22*b* and the wound portion 23 is more than or equal to one-half of a line width h of pieces of coil wiring 24 constituting the wound portion 23, as viewed from the direction parallel to the axis. The line width h of the pieces of coil wiring 24 of the wound portion 23 refers to a dimension in a direction orthogonal to a direction, in which the pieces of coil wiring 24 extend, as viewed from the direction parallel to the axis or, more specifically, a width of the second end 23*b* that is a portion to be connected to the second extended portion 22 in the wound portion 23.

According to the above-described configuration, the vertical line portion 22*b* and the wound portion 23 can be more widely separated as viewed from the direction parallel to the axis, and shorting between the second extended portion 22 and the wound portion 23 can be more effectively prevented.

Note that although the second extended portion 22 has the horizontal line portion 22*a* and the vertical line portion 22*b* in this embodiment, at least one of the first extended portion 21 and the second extended portion 22 may have a horizontal line portion and a vertical line portion. If the first extended portion 21 has a horizontal line portion and a vertical line portion, the vertical line portion and the wound portion 23 can be separated, and shorting between the first extended portion 21 and the wound portion 23 can be prevented. If the first extended portion 21 has a horizontal line portion and a vertical line portion, a shortest distance between the vertical line portion and the wound portion 23 is preferably more than or equal to one-half of a line width h of pieces of coil wiring constituting the wound portion 23. Specifically, the line width of the pieces of coil wiring of the wound portion 23 is a width of the first end 23*a* that is a portion to be connected to the first extended portion 21 in the wound portion 23.

Note that the present disclosure is not limited to the above-described embodiments and that design changes can be made without departing from the scope of the present disclosure. For example, features of the first to third embodiments may be variously combined. Specifically, a thickness of second coil wiring may be larger than a thickness of first coil wiring, and the number of layers of coil conductor layers constituting the second coil wiring may be larger than the number of layers of coil conductor layers constituting the first coil wiring.

Although an axis of a coil is orthogonal to side surfaces of an element assembly in the embodiments, the axis may be orthogonal to end surfaces of the element assembly or may be orthogonal to a bottom surface of the element assembly.

Although first and second outer electrodes are L-shaped in the embodiments, the first and second outer electrodes may be, for example, five-sided electrodes. That is, the first outer electrode may be provided in an entire first end surface and respective parts of a first side surface, a second side surface, a bottom surface, and a top surface, and the second outer electrode may be provided in an entire second end surface and respective parts of the first side surface, the second side surface, the bottom surface, and the top surface. Alternatively, the first outer electrode and the second outer electrode may each be provided in a part of the bottom surface.

Example

An example of a manufacturing method for the inductor component 1 will be described below.

First, an insulating paste having borosilicate glass as a main component is repeatedly applied onto a base material, such as a carrier film, by screen printing, thereby forming an insulating layer. The insulating layer is an insulating layer as an external layer which is located outside coil conductor layers. Note that the base material is peeled off from the insulating layer in an arbitrary process and that there is nothing left of the base material in a completed inductor component.

After that, a photosensitive conductive paste layer is applied onto and formed on the insulating layer, and coil conductor layers and outer electrode conductor layers are formed by a photolithography process. Specifically, a photosensitive conductive paste having Ag as a metal main component is applied onto the insulating layer by screen printing, thereby forming the photosensitive conductive paste layer. Additionally, the photosensitive conductive paste layer is irradiated with, for example, ultraviolet light through a photomask and is developed with, for example, an alkali solution. In this manner, the coil conductor layers and the outer electrode conductor layers are formed on the insulating layer. At this time, the coil conductor layers and the outer electrode conductor layers can be formed with the photomask to have a desired pattern.

Then, a photosensitive insulating paste layer is applied onto and formed on the insulating layer, and an insulating layer with openings and via holes provided therein is formed by the photolithography process. Specifically, a photosensitive insulating paste is applied onto the insulating layer by screen printing, thereby forming the photosensitive insulating paste layer. Additionally, the photosensitive insulating paste layer is irradiated with, for example, ultraviolet light through a photomask and is developed with, for example, the alkali solution. At this time, the photosensitive insulating paste layer is patterned with the photomask such that openings are provided on and above the outer electrode conductor layers and such that via holes are provided at end portions of the coil conductor layers.

After that, a photosensitive conductive paste layer is applied onto and formed on the insulating layer with the openings and the via holes provided therein, and coil conductor layers and outer electrode conductor layers are formed by the photolithography process. Specifically, a photosensitive conductive paste having Ag as a metal main component is applied onto the insulating layer by screen printing so as to fill the openings and the via holes, thereby forming the photosensitive conductive paste layer. Additionally, the photosensitive conductive paste layer is irradiated with, for example, ultraviolet light through a photomask and is developed with, for example, the alkali solution. In this manner, the outer electrode conductor layers connected to the outer electrode conductor layers on a lower-level side through the openings and the coil conductor layers connected to the coil conductor layers on the lower-level side through the via holes are formed on the insulating layer.

A process as described above of forming an insulating layer and coil conductor layers and outer electrode conductor layers is repeated, thereby forming a coil composed of coil conductor layers formed on a plurality of insulating layers and outer electrodes composed of outer electrode conductor layers formed on the plurality of insulating layers. Additionally, an insulating paste is repeatedly applied onto the insulating layers with the coil and the outer electrodes by screen printing, thereby forming an insulating layer. The insulating layer is an insulating layer as an external layer which is located outside the coil conductor layers. Note that, if combinations of a coil and outer electrodes are formed in a matrix on an insulating layer in the above-described processes, a mother multilayer body can be obtained.

After that, the mother multilayer body is cut into a plurality of unburned multilayer bodies with, for example, a dicing machine. In the process of cutting the mother multilayer body, outer electrodes are exposed from the mother multilayer body at cut surfaces formed by the cutting. If a cutting position deviation of a fixed amount or larger occurs at this time, outer peripheral edges of coil conductor layers formed in the above-described process appear at an end surface or a bottom surface.

Each unburned multilayer body is burned under predetermined conditions to obtain an element assembly including a coil and outer electrodes. The element assembly is subjected to barrel finishing and is polished to have an appropriate outer size, and portions in which the outer electrodes are exposed from the multilayer body are given Ni plating with a thickness of 2 μm to 10 μm and Sn plating with a thickness of 2 μm to 10 μm. After the above-described processes, an inductor component measuring 0.4 mm×0.2 mm×0.2 mm is completed.

Note that a formation method for a conductor pattern is not limited to the above-described one and may be, for example, conductor paste printing lamination using a screen plate with an opening in the shape of a conductor pattern, a method that patterns, by etching, a conductor film formed by, for example, a sputtering method, a vapor deposition method, or foil pressure bonding, or a method that forms a negative pattern, forms a conductor pattern with a plating film, and then removes unnecessary portions, as in a semi-additive method. Additionally, losses due to high-frequency resistance can be reduced by forming multiple tiers of conductor patterns to achieve a high aspect ratio. More specifically, a process of repeating the conductor pattern formation may be adopted, a process of repeatedly overlaying wiring formed by a semi-additive process may be adopted, a process of forming a part of a stack by a semi-additive process and forming the rest from a further plated film by etching may be adopted, or a process of further plating wiring formed by a semi-additive process to achieve a higher aspect ratio may be combined.

A conductor material is not limited to an Ag paste as described above and may be one of a good conductor, such as Ag, Cu, or Au, which is formed by, for example, a sputtering method, a vapor deposition method, foil pressure bonding, or plating. A formation method for insulating layers, openings, and via holes is not limited to the above-described ones and may be a method that performs pressure bonding of insulating material sheets, spin coating, or spray application and then forms an opening by laser, drilling, or blasting.

Note that, even in the case of laser, drilling, or blasting, an opening of an insulating layer is formed such that an inner diameter on a lower side in a stacking direction is smaller than an inner diameter on an upper side in the stacking direction, as in a photolithography method. Thus, even in this case, an area of a first end surface on the lower side in the stacking direction of via wiring is smaller than an area of a second end surface on the upper side in the stacking direction of a via wiring.

An insulating material is not limited to glass and ceramic materials as described above and may be an organic material, such as epoxy resin, fluorine resin, or polymer resin, or a composite material, such as glass epoxy resin, may be adopted. One low in dielectric constant and dielectric loss is desirable.

A size of an inductor component is not limited to the above-described one. A formation method for an outer electrode is not limited to the method that gives plating to an outer conductor exposed by cutting and may be a method that forms an outer electrode by, for example, dipping in a conductor paste or sputtering after cutting and giving plating to the outer electrode.

What is claimed is:

1. An inductor component comprising:
an element assembly;
a coil which is inside the element assembly and helically wound along an axis of the coil; and
a first outer electrode and a second outer electrode which are on the element assembly and are electrically connected to the coil,
wherein the element assembly includes a plurality of insulating layers which are stacked along the axis,
the coil includes a plurality of pieces of coil wiring which are stacked along the axis and via wiring which extends along the axis and connects the pieces of coil wiring adjacent in a direction of the axis,
the plurality of pieces of coil wiring are each wound along a plane, and are electrically connected in series to configure a helix,
the plurality of pieces of coil wiring includes
a first coil wiring which is located at an endmost on one side in a direction parallel to the axis and is connected to the first outer electrode, and
a second coil wiring which is located at an endmost on the other side in the direction parallel to the axis and is connected to the second outer electrode,
an area of an end surface of the via wiring on the one side in the direction parallel to the axis is smaller than an area of an end surface of the via wiring on the other side in the direction parallel to the axis, and
a thickness of the second coil wiring in the direction parallel to the axis is greater than a thickness of the first coil wiring in the direction parallel to the axis.

2. The inductor component according to claim 1, wherein
the element assembly includes a first end surface and a second end surface which face each other, a first side surface and a second side surface which face each other, a bottom surface which is connected between the first end surface and the second end surface and between the first side surface and the second side surface, and a top surface which faces the bottom surface,
the first outer electrode extends from the first end surface to the bottom surface,
the second outer electrode extends from the second end surface to the bottom surface,
the coil is wound along the axis such that the axis is parallel to the bottom surface and such that the axis intersects the first side surface and the second side surface,
the coil has a wound portion which is helically wound, a first extended portion which is connected between a first end of the wound portion and the first outer electrode, and a second extended portion which is connected between a second end of the wound portion and the second outer electrode, and
at least one of the first extended portion and the second extended portion includes, when viewed from the direction parallel to the axis,
a horizontal line portion which extends away from the wound portion in a direction parallel to the bottom surface on the top surface side of the wound portion, and
a vertical line portion which is connected to the horizontal line portion and extends toward the bottom surface side in a direction orthogonal to the bottom surface.

3. The inductor component according to claim 2, wherein
a shortest distance between the vertical line portion and the wound portion is greater than or equal to one-half of a line width of the pieces of coil wiring configuring the wound portion, when viewed from the direction parallel to the axis.

4. The inductor component according to claim 2, wherein
a line width of the second coil wiring is greater than a line width of the first coil wiring.

5. The inductor component according to claim 2, wherein
the second coil wiring includes a first portion which is connected to the second outer electrode and a second portion other than the first portion, and
a line width of the first portion is greater than a line width of the second portion.

6. The inductor component according to claim 3, wherein
a line width of the second coil wiring is greater than a line width of the first coil wiring.

7. The inductor component according to claim 3, wherein
the second coil wiring includes a first portion which is connected to the second outer electrode and a second portion other than the first portion, and
a line width of the first portion is greater than a line width of the second portion.

8. The inductor component according to claim 1, wherein
a line width of the second coil wiring is greater than a line width of the first coil wiring.

9. The inductor component according to claim 8, wherein
the second coil wiring includes a first portion which is connected to the second outer electrode and a second portion other than the first portion, and
a line width of the first portion is greater than a line width of the second portion.

10. The inductor component according to claim 1, wherein
the second coil wiring includes a first portion which is connected to the second outer electrode and a second portion other than the first portion, and
a line width of the first portion is greater than a line width of the second portion.

11. An inductor component comprising:
an element assembly;
a coil which is inside the element assembly and is helically wound along an axis; and
a first outer electrode and a second outer electrode which are on the element assembly and are electrically connected to the coil,
wherein the element assembly includes a plurality of insulating layers which are stacked along the axis,
the coil includes a plurality of pieces of coil wiring which are stacked along the axis,
the plurality of pieces of coil wiring are each wound along a plane, and are electrically connected in series to configure a helix,
the coil wiring includes one coil conductor layer or a plurality of coil conductor layers which are stacked along the axis and are electrically connected in parallel,
the plurality of pieces of coil wiring includes
a first coil wiring which is located at an endmost on one side in a direction parallel to the axis and is connected to the first outer electrode, and a second coil wiring which is located at an endmost on the other side in the direction parallel to the axis and is connected to the second outer electrode, a number of layers of the coil conductor layers configuring the second coil wiring is greater than a number of layers of the coil conductor layers configuring the first coil wiring, the coil includes via wiring which extends along the axis and connects the pieces of coil wiring adjacent in a direction of the axis, and an area of an end surface of the via wiring on the one side in the direction parallel to the axis is smaller than an area of an end surface of the via wiring on the other side in the direction parallel to the axis.

12. The inductor component according to claim 11, wherein the element assembly includes a first end surface and a second end surface which face each other, a first side surface and a second side surface which face each other, a bottom surface which is connected between the first end surface and the second end surface and between the first side surface and the second side surface, and a top surface which faces the bottom surface, the first outer electrode extends from the first end surface to the bottom surface, the second outer electrode extends from the second end surface to the bottom surface, the coil is wound along the axis such that the axis is parallel to the bottom surface and such that the axis intersects the first side surface and the second side surface, the coil has a wound portion which is helically wound, a first extended portion which is connected between a first end of the wound portion and the first outer electrode, and a second extended portion which is connected between a second end of the wound portion and the second outer electrode, and at least one of the first extended portion and the second extended portion includes, when viewed from the direction parallel to the axis, a horizontal line portion which extends away from the wound portion in a direction parallel to the bottom surface on the top surface side of the wound portion, and a vertical line portion which is connected to the horizontal line portion and extends toward the bottom surface side in a direction orthogonal to the bottom surface.

13. The inductor component according to claim 12, wherein a shortest distance between the vertical line portion and the wound portion is greater than or equal to one-half of a line width of the pieces of coil wiring configuring the wound portion, when viewed from the direction parallel to the axis.

14. The inductor component according to claim 11, wherein a line width of the second coil wiring is greater than a line width of the first coil wiring.

15. The inductor component according to claim 11, wherein the second coil wiring includes a first portion which is connected to the second outer electrode and a second portion other than the first portion, and a line width of the first portion is greater than a line width of the second portion.

16. An inductor component comprising:

an element assembly;

a coil which is inside the element assembly and is helically wound along an axis; and a first outer electrode and a second outer electrode which are on the element assembly and are electrically connected to the coil, wherein the element assembly includes a plurality of insulating layers which are stacked along the axis, the coil includes a plurality of pieces of coil wiring which are stacked along the axis, the plurality of pieces of coil wiring are each wound along a plane, and are electrically connected in series to configure a helix, the coil wiring includes one coil conductor layer or a plurality of coil conductor layers which are stacked along the axis and are electrically connected in parallel, the plurality of pieces of coil wiring includes a first coil wiring which is located at an endmost on one side in a direction parallel to the axis and is connected to the first outer electrode, and a second coil wiring which is located at an endmost on the other side in the direction parallel to the axis and is connected to the second outer electrode, a number of layers of the coil conductor layers configuring the second coil wiring is greater than a number of layers of the coil conductor layers configuring the first coil wiring, the element assembly includes a first end surface and a second end surface which face each other, a first side surface and a second side surface which face each other, a bottom surface which is connected between the first end surface and the second end surface and between the first side surface and the second side surface, and a top surface which faces the bottom surface, the first outer electrode extends from the first end surface to the bottom surface, the second outer electrode extends from the second end surface to the bottom surface, the coil is wound along the axis such that the axis is parallel to the bottom surface and such that the axis intersects the first side surface and the second side surface, the coil has a wound portion which is helically wound, a first extended portion which is connected between a first end of the wound portion and the first outer electrode, and a second extended portion which is connected between a second end of the wound portion and the second outer electrode, and at least one of the first extended portion and the second extended portion includes, when viewed from the direction parallel to the axis, a horizontal line portion which extends away from the wound portion in a direction parallel to the bottom surface on the top surface side of the wound portion, and a vertical line portion which is connected to the horizontal line portion and extends toward the bottom surface side in a direction orthogonal to the bottom surface.

17. An inductor component comprising:

an element assembly;

a coil which is inside the element assembly and is helically wound along an axis; and a first outer electrode and a second outer electrode which are on the element assembly and are electrically connected to the coil, wherein the element assembly includes a plurality of insulating layers which are stacked along the axis, the coil includes a plurality of pieces of coil wiring which are stacked along the axis, the plurality of pieces of coil wiring are each wound along a plane, and are electrically connected in series to configure a helix, the coil wiring includes one coil conductor layer or a plurality of coil conductor layers which are stacked along the axis and are electrically connected in parallel, the plurality of pieces of coil wiring includes a first coil wiring which is located at an endmost on one side in a direction parallel to the axis and is connected to the first outer electrode, and a second coil wiring which is located at an endmost on the other side in the direction parallel to the axis and is connected to the second outer electrode, a number of layers of the coil conductor layers configuring the second coil wiring is greater than a number of layers of the coil conductor layers configuring the first coil wiring, the second coil wiring includes a first portion which is connected to the second outer electrode and a second portion other than the first portion, and a line width of the first portion is greater than a line width of the second portion.

* * * * *